United States Patent [19]
Firmin

[11] Patent Number: 6,073,386
[45] Date of Patent: Jun. 13, 2000

[54] FISHING RIG AND SINKER

[75] Inventor: Herman P. Firmin, Baton Rouge, La.

[73] Assignee: Knight Manufacturing Co., Inc., Tyler, Tex.

[21] Appl. No.: 09/417,655

[22] Filed: Oct. 14, 1999

[51] Int. Cl.$^7$ .......................... A01K 91/04; A01K 95/00
[52] U.S. Cl. ............................................ 43/44.87; 43/44.9
[58] Field of Search ................. 43/44.97, 44.96, 43/44.9, 44.91, 44.87

[56] References Cited

U.S. PATENT DOCUMENTS

| | | | |
|---|---|---|---|
| 1,193,912 | 8/1916 | Maire et al. | 43/43.1 |
| 1,848,600 | 3/1932 | Best | 43/43.1 |
| 1,883,574 | 10/1932 | Cleeland | 43/43.1 |
| 2,599,973 | 6/1952 | Bujaky | 43/43.1 |
| 2,792,665 | 5/1957 | Brickler | 43/44.87 |
| 2,814,903 | 12/1957 | Banowetz | 43/44.87 |
| 2,831,288 | 4/1958 | Killebrew | 43/44.97 |
| 4,137,664 | 2/1979 | Beres | 43/43.1 |
| 5,031,351 | 7/1991 | Rogel | 43/44.87 |
| 5,129,178 | 7/1992 | Hicks | 43/43.1 |
| 5,388,368 | 2/1995 | Lawrence | 43/44.9 |
| 5,435,095 | 7/1995 | Crumrine et al. | 43/44.9 |

*Primary Examiner*—Jack W. Lavinder
*Attorney, Agent, or Firm*—Charles M. Kaplan

[57] ABSTRACT

An adjustable fishing rig comprises a unitary, streamlined, hollow, double barreled sinker through which a fishing line is threaded. The sinker can be moved to any location along a fishing line without untying the line or tying new knots.

19 Claims, 2 Drawing Sheets

FISHING RIG AND SINKER

BACKGROUND OF THE INVENTION

This invention relates to fishing rigs that include a sinker, and more particularly to rigs in which the sinker is adjustable along the fishing line.

Many fishing rigs, such as the Carolina rig, require several knots tied in the fishing line to position a sinker a desired distance ahead of a lure or fish hook, and each knot weakens the line. When the distance between the lure or hook and the sinker is changed, the line must be cut and new knots must be tied, and this wastes valuable time at the fishing site.

OBJECTIVES OF THE INVENTION

Accordingly, it is an object of this invention to provide improved fishing rigs and sinkers.

Another object is to provide an adjustable fishing rig with a sinker that can be moved along a fishing line without requiring the untying of knots and the tying of new knots.

An additional object is to minimize the number of knots that must be tied in a Caroling fishing rig.

Another object is to provide a fishing sinker and rig that is less likely to snag on or to collect weeds or debris in the water being fished.

A further object is to provide a fishing sinker that prevents fishing lines from twisting.

Another object is to protect fishing lines from nicking and abrasion.

A further object is to provide streamlined fishing sinkers that can be cast, trolled or still fished, that are rugged, economical, attractive, easy use, and which do not possess defects found in similar prior art sinkers.

Other objects and advantages of the sinkers and rigs incorporating this invention will be found in the specification and claims and the scope of the invention will be set forth in the claims.

DESCRIPTION OF THE INVENTION

Figure 1:
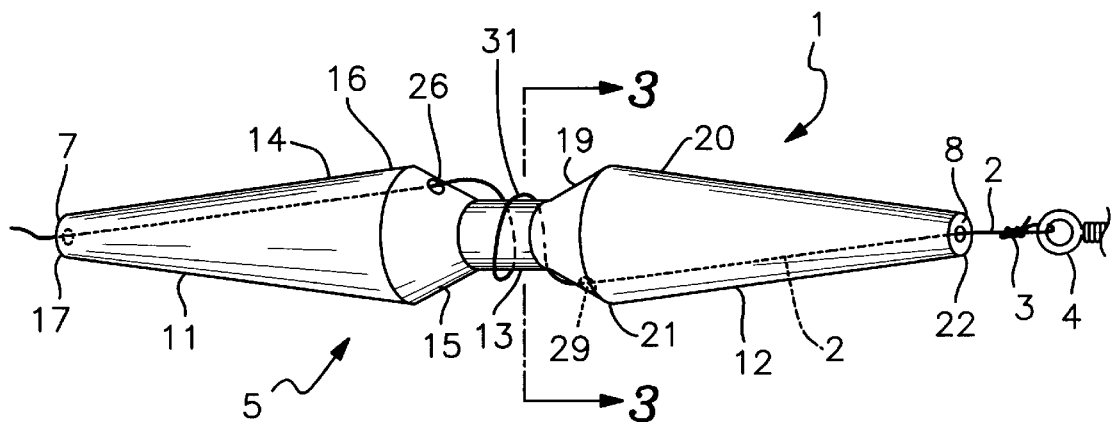
FIG. 1 is a perspective view of an embodiment of a fishing rig in accord with this invention.
Figure 2:
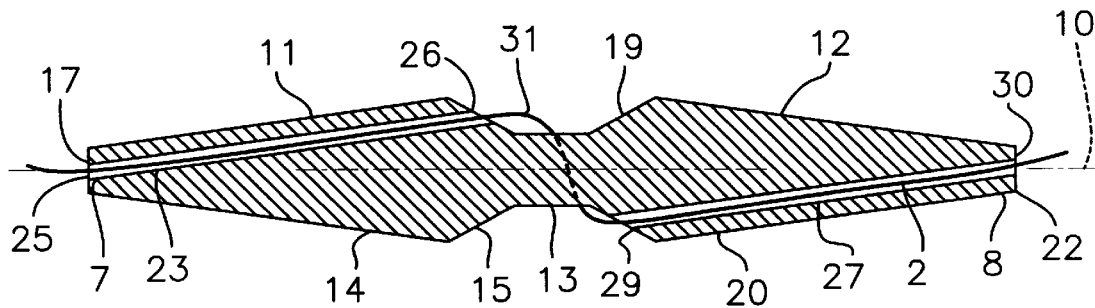
FIG. 2 is cross sectional side view of the sinker in FIG. 1.
Figure 3:
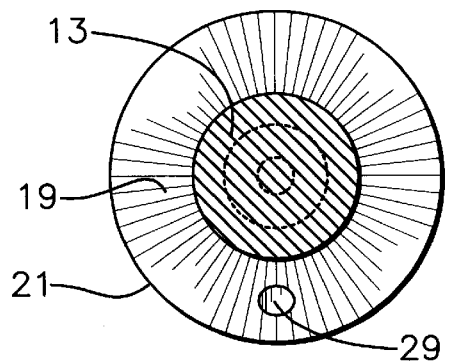
FIG. 3 is an enlarged cross sectional view taken along the line 3—3 in FIG. 1.

The drawing shows a fishing rig 1 that includes a fishing line 2 which has been tied by a knot 3 to fishing tackle connector means, such as the eyelet 4, of a fish hook, lure or other fish attracting or catching device. A sinker 5, in accord with this invention is adjustably attached to the line 2 between the eyelet 4 and the fishing rod or reel.

The sinker 5 is an elongated, streamlined, integral one piece body of material that is dense enough to sink in water. Sinker 5 has a front terminal end 7, a back terminal end 8, and a longitudinal central axis 10. The sinker body has an enlarged conical forward portion 11 and an essentially identical enlarged conical rearward portion 12 that are connected by a cylindrical center portion 13 of reduced diameter. The forward portion 11 has a pair of mating conical sections 14 and 15 that are joined at a common circular base 16 which is located closer to the center portion 13 than to the front terminal end 7. This makes the one conical section 15 that is closest to the center section 13 shorter than its mating conical section 14. The apex 17 of the longer conical section 14 coincides with the front terminal end 7. The rearward portion 12 has a pair of mating conical sections 19 and 20 that are joined at a common circular base 21 which is located closer to the center portion 13 than to the back terminal end 8. This makes the one conical section 19 that is closest to the center section 13 shorter than its mating conical section 20. The apex 22 of the longer conical section 20 coincides with the back terminal end 8.

The forward portion 11 has a forward bore 23 that extends there through for receiving the fishing line 2. One end 25 of the bore 23 begins at the front terminal end 7 and the opposite end 26 of the bore 23 exits from forward portion through the short conical section 15 of the forward portion 14. The rearward portion 12 has a rearward bore 27 that extends there through for receiving the fishing line 2. One end 29 of the bore 27 begins at the one shorter conical section 19 of the rearward portion, and the opposite end 30 of the bore 27 exits from rearward portion through the back terminal end 8. The end 26 of the bore 23 and the end 29 of the bore 27 are offset from each other on opposite sides of the central axis 10.

The fishing line 2 has been threaded in through the end 25 of the bore 23 and out through the bore end 26, and then around the center portion 13 and in through the end 29 of the bore 27 and out through the bore end 30 to the tackle connector 4.

The segment 31 of the line 2 that extends between the bore ends 26 and 29 contacts the reduced diameter center portion 13. The segment 31 can be wound around the center portion 13 several times (e.g. three times), and this will hold the sinker 5 at a predetermined distance ahead of the tackle to which the knot 3 is tied. When it is necessary to change or adjust the location of the sinker 5, the wraps or winds of the segment 31 encircling the center portion 12 can be loosened, and the sinker can be moved along the line 2 to another location without tying or untying any knots. When the segment 31 passes directly from the bore end 26 into the bore end 29 without being wrapped around the center portion 13, the sinker will function as a slip sinker that permits a fish taking a bait or lure to pull out line 2 without significant resistance from the line passing through the bores and over the center portion 13. Although the locations of the sinker 5 on the line 2 are essentially unlimited, only one knot is required.

Figure 4:
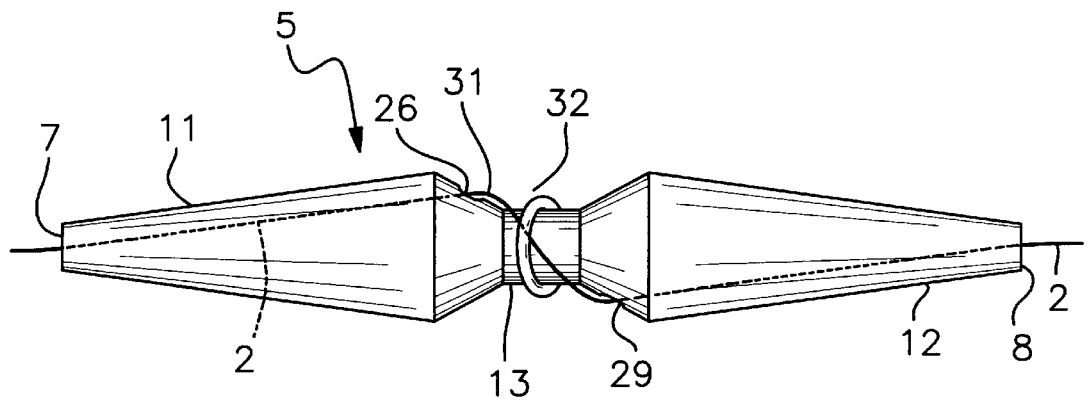
FIG. 4 is a side view of another embodiment of the invention.

In the embodiment shown in FIG. 4, a resilient O-ring 32 encircles the reduced center portion 13 in gripping contact therewith. The line segment 31 is not wrapped around the center portion 13, but instead, is threaded under the O-ring between the bore ends 26 and 29. The frictional contact of the O-ring pressing the segment 31 against the center portion 13 will hold the sinker in any predetermined location on the line 2. To adjust or change the location of the sinker 5, it is merely necessary to pull the line through the O-ring 32. Also, when the sinker 5 has been rigged as a slip sinker, but it is later realized that the sinker must be held immovable on the line 2, the sinker and line can be threaded into an O-ring 32 as shown in FIG. 4. This will convert the slip sinker rig into a fixed sinker rig without requiring the tying or untying of any additional knots.

Figure 5:
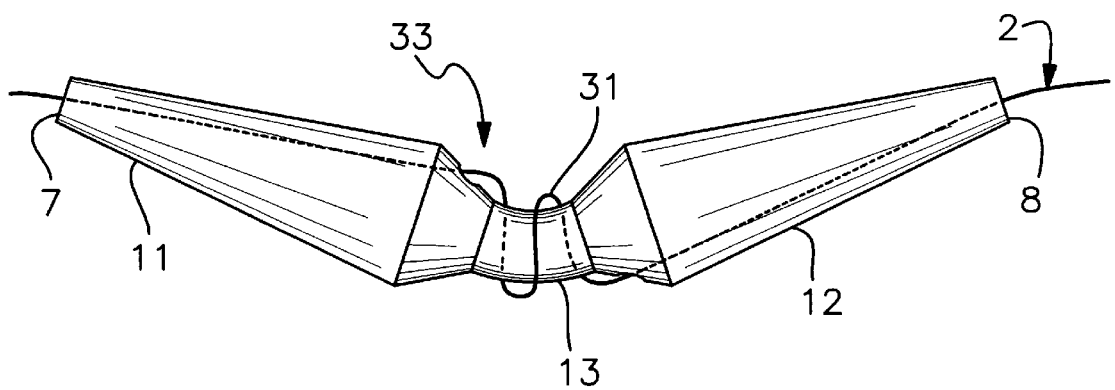
FIG. 5 is a of side view of another embodiment of the invention.

The body of sinker 5 may be molded from any non soluble material that is dense enough to sink in water. When the material is a relatively pliable or bendable metal such as lead or a soft copper alloy, the reduced center portion 13 can be bent by moving the forward and rearward portions 11 and 12 toward each other, as shown in FIG. 5. This causes the sinker 5 to have a keel shape 33. This will cause the bent center portion 12 to always remain lower than the terminal ends 7 and 8, which will prevent the rig 1 from spinning when the rig is moved through water. The keel shape 33 thus prevents the line 2 from becoming twisted when the rig 1 is used for trolling.

The streamlined double conical shape of the forward and rearward portion 11 and 12 enables the sinker 5 to snake through aquatic plants and around and over rocks, roots and other obstructions in the water without picking up debris or becoming snagged. The sinker 5 produces minimal turbulence when the rig 1 is trolled, and sinker 5 can also be pulled along or retrieved in contact with the bottom of a body of water with minimal disturbance, resistance and turbulence. Also, the streamlined sinker 6 can be cast like a bullet with exceptional accuracy and for greater distances. Except for the segment 31, all parts of the line 2 that are in contact with the body of sinker 2 are completely enclosed and surrounded in the bores 23 and 27 by the material from which the sinker is made. This protects the line 2 from abrasion and nicking at the locations of the line's greatest vulnerability. The sinker can also be broken or cut in half at the reduced center portion 13 to produce two slip sinkers each having half the weight of the original sinker.

While the present invention has been described with reference to particular embodiments, it is not intended to illustrate or describe all of the equivalent forms or ramifications thereof. Also, the words used are words of description rather than limitation, and various changes may be made without departing from the spirit or scope of the invention disclosed herein. It is intended that the appended claims cover all such changes as fall within the true spirit and scope of the invention.

I claim:

1. A fishing sinker for adjustable attachment along a fishing line comprising, an elongated integral body of material that is heavier than water having a front terminal end and a back terminal end and a longitudinal central axis; said body having an enlarged forward portion and an enlarged rearward portion and a reduced center portion; a forward bore extending through said forward portion of said body for receiving fishing line, one end of said forward bore beginning at said front terminal end of said body and being located on said central axis, said forward bore having an opposite end exiting from said forward portion of said body immediately adjacent to one side of said reduced center portion of said body; a rearward bore extending through said rearward portion of said body for receiving fishing line, one end of said rearward bore beginning immediately adjacent to said reduced center portion on a side of said reduced center portion opposite to said one side of said reduced center portion, so that fishing line extending between said forward and rearward bores can contact said reduced center portion for adjustment of said sinker along said fishing line, and said rearward bore having an opposite end exiting from said rearward portion of said body at said back terminal end and being located on said central axis, said opposite end of said forward bore and said one end of said rearward bore being offset from said central axis, and said forward and rearward bores are each completely enclosed within said body except for their respective ends so that fishing line within said bores is completely surrounded by the material from which said body is made.

2. The adjustable sinker defined in claim 1, wherein the offset ends of said forward and rearward bores are on opposite sides of said central axis.

3. The adjustable sinker defined in claim 1, further comprising, forward portion being essentially conical with its apex end at said front terminal end.

4. The adjustable sinker defined in claim 3, further comprising, said rearward portion being conical with its apex end at said back terminal end.

5. The adjustable sinker defined in claim 1, further comprising, said reduced center portion being essentially cylindrical.

6. The adjustable sinker defined in claim 1, further comprising, said forward portion comprising a pair of mating conical sections having a common base, said base being located closer to said opposite end of said forward bore than to said one end of said forward bore so that the conical section of said forward portion that is closest to said center potion is shorter than its mating conical section.

7. The adjustable sinker defined in claim 6, further comprising, said rearward portion comprising a pair of mating conical sections having a common base, said base being located closer to said one end of said rearward bore than to said opposite end of said rearward bore so that the conical section of said rearward portion that is closest to said center portion is shorter than its mating conical section.

8. The adjustable sinker defined in claim 7, further comprising, said opposite end of said forward bore exits from said body through the shorter conical section of said forward portion, and said one end of said rearward bore enters said rearward portion through the shorter conical section of said rearward portion.

9. The adjustable sinker defined in claim 1, further comprising, said material being bendable so that bending of said forward portion and said rearward portion toward each other at said center portion into a keel prevents twisting of the fishing line.

10. The adjustable sinker defined in claim 1, further comprising, a resilient O-ring surrounding said fishing line and said center portion.

11. A fishing sinker for adjustable attachment along a fishing line comprising, an elongated integral body of material that sinks in water having a longitudinal central axis and a front terminal end and a back terminal end; said body having an enlarged conical forward portion and an enlarged conical rearward portion and a reduced cylindrical center portion; said forward portion comprising a pair of mating conical sections having a common base, said base being located closer to said center portion than to said front terminal end so that one conical section of said forward portion that is closest to said center potion is shorter than its mating conical section, said mating conical section of said forward portion having its apex at said front terminal end; said rearward portion comprising a pair of mating conical sections having a common base, said base being located closer to said center portion than to said back terminal end so that one conical section of said rearward portion that is closest to said center portion is shorter than its mating conical section, said mating conical section of said rearward portion having its apex at said back terminal end; a forward bore extending through said forward portion of said body for receiving fishing line, one end of said forward bore beginning at said front terminal end of said body, said forward bore having an opposite end exiting from said forward portion of said body through said one shorter conical section of said forward portion; a rearward bore extending through said rearward portion of said body for receiving fishing line, one end of said rearward bore beginning in said rearward portion through said one shorter conical section of said rearward portion, said rearward bore having an opposite end exiting from said rearward portion of said body at said back terminal end, said one end of said forward bore and said opposite end of said rearward bore being located on said central axis, and said opposite end of said forward bore and said one end of said rearward bore being offset from each other on opposite sides of said central axis, so that fishing line extending between said forward and rearward bores can contact said center portion for adjustment of said sinker along said fishing line; and said forward and rearward bores are each completely enclosed within said body except for their respective ends so that fishing line within said bores is completely surrounded by the material from which said body is made.

12. The adjustable sinker defined in claim 11, further comprising, said material being bendable so that bending of said forward portion and said rearward portion toward each other at said center portion into a keel prevents twisting of the fishing line.

13. The fishing rig defined in claim 11, further comprising a resilient O-ring surrounding said center portion and the fishing line wound around said center portion.

14. An adjustable fishing rig comprising a fishing line, a tackle connector attached to the line and sinker for movable attachment along the fishing line ahead of the tackle connector, said sinker comprising, an elongated integral body of material that is heavier than water having a front terminal end and a back terminal end and a longitudinal central axis; said body having an enlarged forward portion and an enlarged rearward portion and a reduced center portion; a forward bore extending through said forward portion of said body, one end of said forward bore beginning at said front terminal end of said body and being located on said central axis, said forward bore having an opposite end exiting from said forward portion of said body immediately adjacent to one side of said reduced portion of said body; a rearward bore extending through said rearward portion of said body, one end of said rearward bore beginning immediately adjacent to said reduced center portion on a side opposite to said one side, said rearward bore having an opposite end exiting from said from said rearward portion of said body at said back terminal end and being located on said central axis, said opposite end of said forward bore and said one end of said rearward bore being offset from said central axis, said fishing line extending from said hook and entering said sinker through said opposite end of said rearward bore and passing through said rearward bore and exiting from said rearward bore through said one end of said rearward bore, said fishing line being wound around said reduced center portion and entering said forward bore through its opposite end, said line passing through said forward bore and exiting from said sinker through said one end of said forward bore, said forward and rearward bores each being completely enclosed within said body except for their respective ends so that fishing line within said bores is completely surrounded by the material from which said body is made, and said sinker is held in a predetermined location on said line without knots because the line is wound around said reduced center portion and said sinker is a movable along said line by loosening and tightening of the line wound around said center portion.

15. The adjustable fishing rig defined in claim 14 further comprising, said opposite end of said forward bore and said one end of said rearward bore being offset from each other on opposite sides of said central axis.

16. The adjustable fishing rig defined in claim 14, further comprising, said forward portion comprising a pair of mating conical sections having a common base, said base being located closer to said opposite end of said forward bore than to said one end of said forward bore so that one conical section of said forward portion that is closest to said center potion is shorter than its mating conical section, and said mating conical section of said forward portion has its apex at said front terminal end.

17. The adjustable fishing rig defined in claim 16, further comprising, said rearward portion comprising a pair of mating conical sections having a common base, said base being located closer to said one end of said rearward bore than to said opposite end of said rearward bore so that one conical section of said rearward portion that is closest to said center portion is shorter than its mating conical section, and said mating conical section of said rearward portion has its apex at said back terminal end.

18. The adjustable fishing rig defined in claim 17, further comprising, said opposite end of said forward bore exiting from said body through said one shorter conical section of said forward portion, and said one end of said rearward bore enters said rearward portion through said one shorter conical portion of said rearward portion.

19. The adjustable fishing rig defined in claim 14, further comprising a resilient O-ring surrounding said center portion and the fishing line wound around said center portion.

* * * * *